(12) United States Patent
Tardiff et al.

(10) Patent No.: US 11,718,126 B2
(45) Date of Patent: Aug. 8, 2023

(54) NON-PNEUMATIC TIRES WITH STRAIN LIMITING FEATURES

(71) Applicant: Ford Global Technologies, LLC, Dearborn, MI (US)

(72) Inventors: Janice Lisa Tardiff, Plymouth, MI (US); Adam Wirth, Belleville, MI (US); Wesley Grant Morris, Dearborn, MI (US); Cindy Sofia Barrera-Martinez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 560 days.

(21) Appl. No.: 16/838,181

(22) Filed: Apr. 2, 2020

(65) Prior Publication Data

US 2020/0324573 A1 Oct. 15, 2020

Related U.S. Application Data

(60) Provisional application No. 62/832,924, filed on Apr. 12, 2019.

(51) Int. Cl.
*B60B 9/04* (2006.01)
*B60C 7/14* (2006.01)
*B60B 9/26* (2006.01)
*B60C 7/18* (2006.01)

(52) U.S. Cl.
CPC .................. *B60B 9/04* (2013.01); *B60B 9/26* (2013.01); *B60C 7/14* (2013.01); *B60C 7/146* (2021.08); *B60C 7/18* (2013.01); *B60B 2900/20* (2013.01)

(58) Field of Classification Search
CPC ..... B60B 9/04; B60B 9/26; B60C 7/14; B60C 7/146; B60C 7/107; B60C 7/18
See application file for complete search history.

(56) References Cited

U.S. PATENT DOCUMENTS

| | | | | |
|---|---|---|---|---|
| 1,027,409 A | * | 5/1912 | Etzold | B60B 9/26 152/85 |
| 1,177,628 A | * | 4/1916 | Immke | B60B 9/10 152/80 |
| 1,215,730 A | * | 2/1917 | Smith | B60B 9/26 152/72 |
| 1,349,019 A | * | 8/1920 | Timberlake | B60B 9/26 152/80 |
| 1,373,101 A | * | 3/1921 | Schlake | B60B 9/26 152/82 |

(Continued)

FOREIGN PATENT DOCUMENTS

DE 324181 C * 9/1920
DE 743118 C * 12/1943
(Continued)

*Primary Examiner* — Kip T Kotter
(74) *Attorney, Agent, or Firm* — Burris Law, PLLC (57) ABSTRACT

A non-pneumatic tire includes a wheel portion, a tread ring portion, a plurality of flexible spokes extending between and attached to the wheel portion and the tread ring portion, and plurality of bump stops positioned between the wheel portion and the tread ring portion. The bumps stops are configured to limit deformation and/or compressive strain of the plurality of flexible spokes. The plurality of bump stops includes a plurality of tower bump stops, a plurality of triangular-shaped bump stops, and/or a plurality of roof-top shaped bump stops.

20 Claims, 4 Drawing Sheets

(56) References Cited

U.S. PATENT DOCUMENTS

| | | | | | |
|---|---|---|---|---|---|
| 1,643,248 | A | * | 9/1927 | Lawrence | B60B 9/26 152/85 |
| 4,026,342 | A | * | 5/1977 | Wormley | B60B 9/04 152/73 |
| 4,553,577 | A | * | 11/1985 | Gregg | B60B 9/26 152/80 |
| 4,921,029 | A | * | 5/1990 | Palinkas | B60C 7/26 152/323 |
| 2019/0337329 | A1 | * | 11/2019 | Cron | B60C 7/18 |

FOREIGN PATENT DOCUMENTS

| | | | | | |
|---|---|---|---|---|---|
| EP | 1980301 | A1 | * | 10/2008 | A63C 17/0046 |
| GB | 1292928 | A | * | 10/1972 | |
| WO | WO-0078560 | A1 | * | 12/2000 | B60B 5/02 |
| WO | WO-2006112574 | A1 | * | 10/2006 | B60B 9/26 |
| WO | WO-2010012091 | A1 | * | 2/2010 | B60B 9/04 |

\* cited by examiner

NON-PNEUMATIC TIRES WITH STRAIN LIMITING FEATURES

CROSS-REFERENCE TO RELATED APPLICATIONS

This application claims priority to U.S. provisional application No. 62/832,924 filed on Apr. 12, 2019. The disclosure of the above application is incorporated herein by reference.

FIELD

The present disclosure relates to non-pneumatic tires, and more particularly the design aspects and performance features of non-pneumatic tires.

BACKGROUND

The statements in this section merely provide background information related to the present disclosure and may not constitute prior art.

When a non-pneumatic tire rolls over an object on a road surface such as a speed bump, a pot hole, and the like, some of the spokes of the tire are subjected to compressive loads while other spokes are subjected to tensile loads. Particularly, spokes that are between a wheel portion of the non-pneumatic tire and a tread portion of the tire that hits or impacts such an object (referred to herein as a "contact patch") undergo compressive deformation and spokes positioned on an opposite side of the wheel portion relative to the contact patch stretch undergo tensile deformation.

The present disclosure addresses the issues of compressive and tensile deformation of non-pneumatic tire spokes, among other issues related to non-pneumatic tires.

SUMMARY

Further areas of applicability will become apparent from the description provided herein. It should be understood that the description and specific examples are intended for purposes of illustration only and are not intended to limit the scope of the present disclosure.

In one form of the present disclosure, a non-pneumatic tire includes a wheel portion, a tread ring portion, and a plurality of flexible spokes extending between and attached to the wheel portion and the tread ring portion. A bump stop is positioned between the wheel portion and the tread ring portion and the bump stop is configured to limit deformation and/or compressive strain of the plurality of flexible spokes. The bump stop can also be used to increase the spring rate in a linear, controlled fashion and control maximum transmitted loads. In some variations of the present disclosure, the bump stop is a plurality of bump stops, for example a plurality of tower bump stops positioned between adjacent flexible spokes and extending from the wheel portion towards the tread ring portion. In such variations, each of the plurality of tower bump stops has an outer surface configured for adjacent flexible spokes to contact during compression of the adjacent flexible spokes. In some variations, the plurality of tower bump stops is a plurality of symmetrical tower bump stops.

In other variations of the present disclosure, the plurality of bump stops is a plurality of triangular-shaped bump stops positioned between adjacent flexible spokes and extend from the wheel portion towards the tread ring portion. In such variations, each of the plurality of triangular-shaped bump stops have an outer surface configured for adjacent flexible spokes to contact during compression of the adjacent flexible spokes. In some variations, each of the plurality of triangular-shaped bump stops is an irregular triangular-shaped bump stop.

In still other variations of the present disclosure, the plurality of bump stops is a plurality of roof-top shaped bump stops positioned between adjacent flexible spokes and extend from the wheel portion towards the tread ring portion. In such variations, each of the plurality of roof-top shaped bump stops has a pair of outer surfaces configured for adjacent flexible spokes to contact during compression of the adjacent flexible spokes. In some variations, the plurality of roof-top shaped bump is a plurality of symmetrical roof-top shaped bump stops.

In still yet other variations of the present disclosure, the plurality of bump stops include a first set of tower stops positioned between adjacent flexible spokes and extend from the wheel portion towards the tread ring portion, and a second set of tower stops positioned between adjacent flexible spokes and extend from the tread ring portion towards the wheel portion. In such variations, each of the first set of tower stops has an outer surface and each of the second set of tower stops has an inner surface. Also, opposing outer surfaces and inner surfaces are configured to abut against each other and limit deformation and/or compression of adjacent flexible spokes. In some variations, the first set of tower bump stops and/or the second set of tower bump stops is a plurality of symmetrical tower bump stops.

In some variations of the present disclosure, the plurality of bump stops is positioned between adjacent flexible spokes that form a diamond shape and extend from the wheel portion towards the tread ring portion. In such variations, each of the plurality of tower bump stops has an outer surface configured to abut against the tread ring portion and limit deformation and/or compression of adjacent flexible spokes. In some variations, the plurality of tower bump stops is a plurality of symmetrical tower bump stops.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
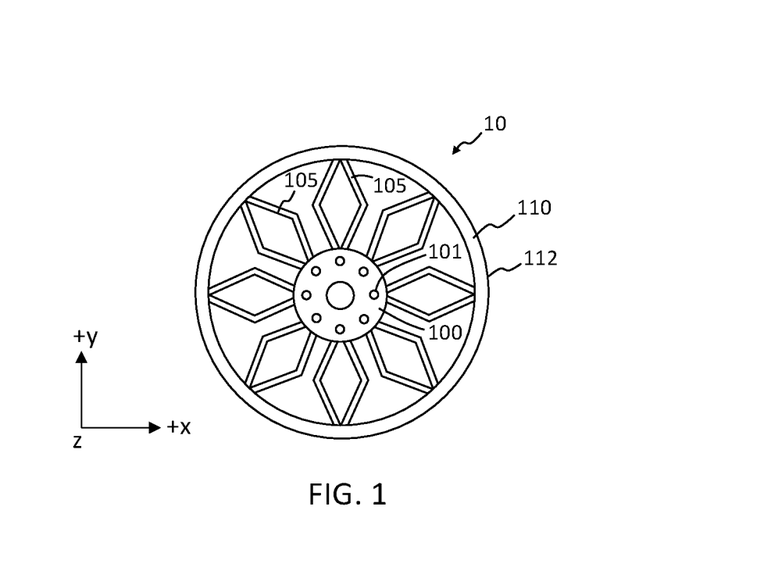
FIG. 1 is a side view of a non-pneumatic tire.

Referring now to FIG. 1, a non-pneumatic tire 10 is schematically depicted. The non-pneumatic tire 10 includes a wheel portion 100, a tread ring portion 110, and a plurality of spokes 105 extending between and attached to the wheel portion 100 and the tread ring portion 110. In some variations of the present disclosure, the wheel portion 100 includes a plurality of lug nut apertures 101 and the tread ring portion includes a tread 112.

Figure 2:
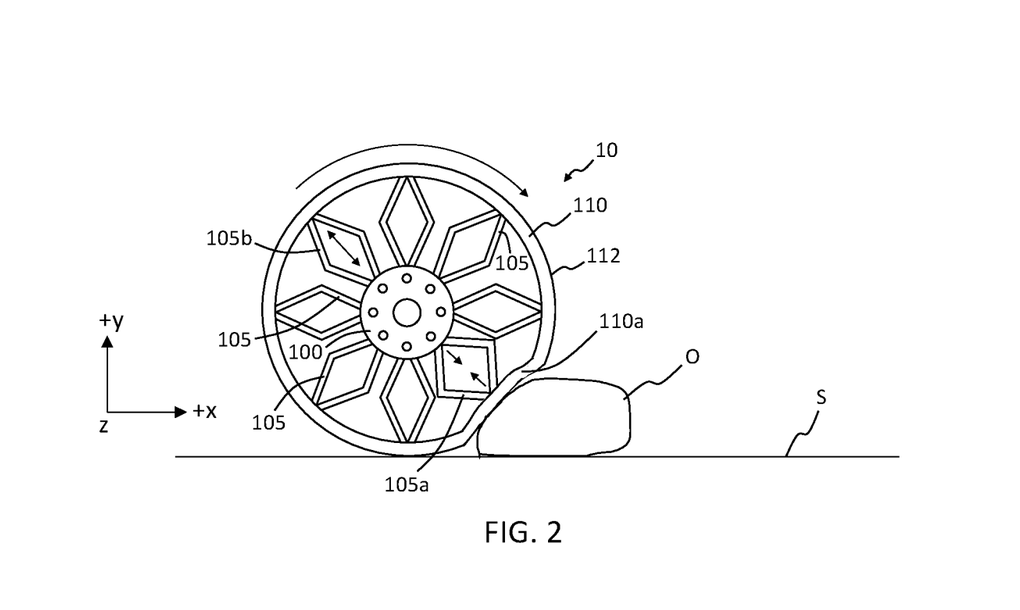
FIG. 2 depicts the non-pneumatic tire in FIG. 1 impacting an object on a road surface.

Referring now to FIG. 2, the non-pneumatic tire 10 rolling on a road surface 'S' and impacting an object 'O' (e.g., a rock, pothole, etc.) is schematically depicted. For example, the non-pneumatic tire 10 can be attached to a vehicle (not shown) traveling along the road surface S. Upon impacting the object O, a contact patch 110a of the tread ring portion 110 is displaced towards the wheel portion 100 thereby resulting in a spoke 105a adjacent to the contact patch 110a being subjected to compression as schematically depicted by the arrows facing each other in FIG. 2. Also, when the non-pneumatic tire 10 hits or impacts the object O, the wheel portion 100 is displaced towards object O and spoke(s) 105b oppositely positioned the contact patch 110a is subjected to tension as schematically depicted by the double headed arrow in FIG. 2. Accordingly, the spokes 105 experience cyclic compression and tension during use of the non-pneumatic tire 10 and it should be understood that cyclic compression and tension of the spokes 105 may result in fatigue deterioration of a spoke 105, deterioration of the non-pneumatic tire 10 where the spoke 105 is attached or joined to the wheel portion 100, deterioration of the non-pneumatic tire 10 where the spoke 105 is attached or joined to the tread ring portion 110, and the like. While FIG. 2 depicts the spokes 105a partially compressed between the wheel portion 100 and the contact patch 110a, it should be understood that non-pneumatic tires can impact objects and be subjected to deformation such that the spokes of the non-pneumatic tires are fully compressed between the wheel portion and the tread ring portion.

Figure 3A:
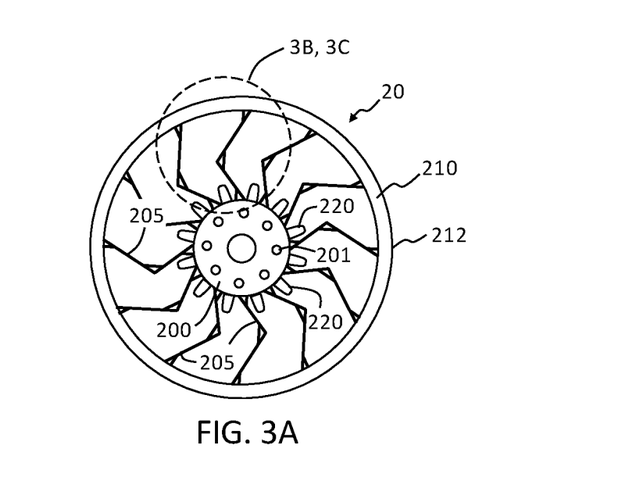
FIG. 3A is a side view of a non-pneumatic tire according to the teachings of the present disclosure.
Figure 3B:
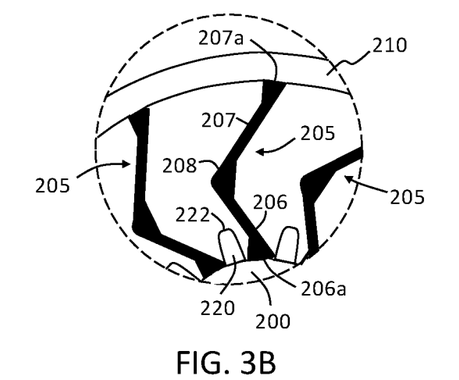
FIG. 3B is an enlarged view of circled region 3B in FIG. 3A with spokes of the non-pneumatic tire in an unloaded position.
Figure 3C:
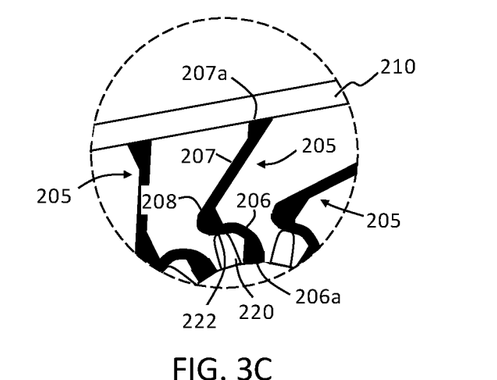
FIG. 3C is an enlarged view of circled region 3C in FIG. 3A with spokes of the non-pneumatic tire in a strained position.

Referring now to FIGS. 3A-3C, a non-pneumatic tire 20 with spoke strain limiting features (i.e., features or elements that limit strain of at least one spoke of a non-pneumatic tire) is schematically depicted according to the teachings of the present disclosure. With reference to FIG. 3A, the non-pneumatic tire 20 includes a wheel portion 200, a tread ring portion 210, and a plurality of spokes 205 extending between and attached to the wheel portion 200 and the tread ring portion 210. In some variations of the present disclosure, the wheel portion 200 includes a plurality of lug nut apertures 201 and the tread ring portion includes a tread 212. With reference to FIG. 3B, an enlarged view of circled region 3B shown in FIG. 3A is schematically depicted with the spokes 205 in an unstrained state. The spokes 205 include an inner leg 206 and an outer leg 207. As used herein, the term "inner" refers to an element positioned proximate to, an element facing, or a direction (from the tread ring portion 210) towards the wheel portion 200 of the non-pneumatic tire 20, and the term "outer" refers to an element positioned proximate to, an element facing, or a direction (from the wheel portion 200) towards the tread ring portion 210 of the non-pneumatic tire 20. Positioned between the inner leg 206 and the outer leg 207 is an elbow 208. In some variations of the present disclosure, the elbow 208 is reinforced such that durability of the elbow 208 during repeated deformation or flexing of the spoke 205 is provided. Also, in some variations the inner leg 206 of the spoke 205 comprises a reinforced inner end 206a attached to the wheel portion 200 and/or the outer leg 207 comprises a reinforced outer end 207a attached to the tread ring portion 210.

Positioned between adjacent spokes 205 is at least one tower bump stop 220 that limits the strain of at least one spoke 205 during impact of the non-pneumatic tire 20 with an object O. As used herein, the term "bump stop" refers to a member extending from a wheel portion or a tread ring portion of a non-pneumatic tire that limits deformation and/or strain of at least one spoke when the spoke is under load. It should be understood that the at least one bump stop 220, and other bump stops disclosed herein, may be deformable (e.g., a rubber bump stop), or in the alternative may be not be deformable (e.g., a rigid plastic bump stop). In some variations of the present disclosure, the tower bump stops 220 are symmetrical tower bump stops. Each of the tower bump stops 220 has an outer surface 222 (e.g., an arcuate outer surface) configured to support and limit the strain of an adjacent spoke 205 as schematically depicted in FIG. 3C. Particularly, during deformation and/or compressive strain of one or more spokes 205, a tower bump stop 220 limits the inner movement or deflection at the initial spring rate of the spoke(s) 205 by providing a stop (i.e., outer surface 222) that limits or reduces the deformation and/or compressive strain of the spoke(s) 205 compared to deformation and/or compressive strain that would occur if the tower bump stop 220 was not present. As schematically depicted in FIG. 3C, the inner leg 206 and the elbow 208 of the spokes 205 come in contact with and are supported by the outer surface 222 of the tower bump stop 220. Accordingly, the deformation and strain of the inner leg 206, the inner end 206a, the outer leg 207, and/or the outer end 207a is reduced. It should be understood that reducing deformation and/or compressive strain of the spokes 205 using the tower bump stops 220 enhances the durability of the spokes 205 and the non-pneumatic tire 20.

Figure 4A:
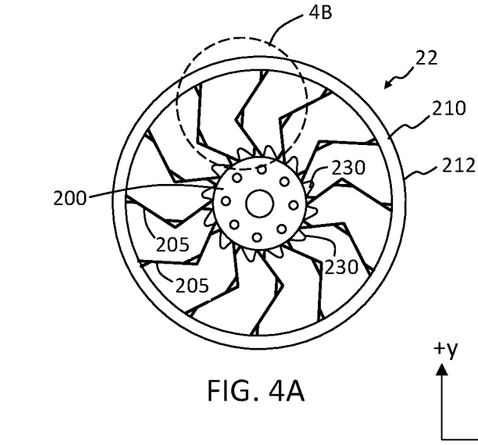
FIG. 4A is a side view of another non-pneumatic tire according to the teachings of the present disclosure.
Figure 4B:
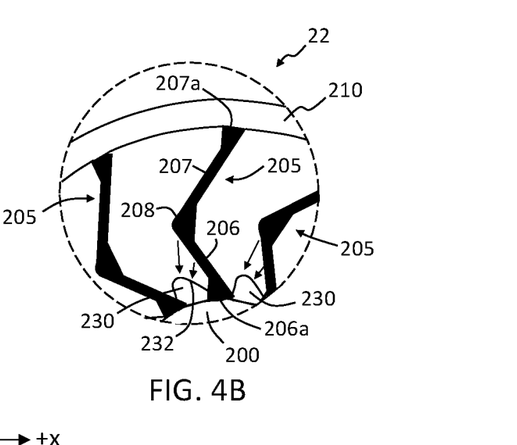
FIG. 4B is an enlarged view of circled region 4B in FIG. 4A with spokes of the non-pneumatic tire in an unstrained position.

Referring now to FIGS. 4A and 4B, another non-pneumatic tire 22 according to the teachings of the present disclosure is schematically depicted. With reference to FIG. 4A, the non-pneumatic tire 22 includes the wheel portion 200, the tread ring portion 210, and the plurality of spokes 205 extending between and attached to the wheel portion 200 and the tread ring portion 210. With reference to FIG. 4B, an enlarged view of circled region 4B shown in FIG. 4A is schematically depicted with the spokes 205 in an unstrained state. Positioned between adjacent spokes 205 are bump stops 230. Each of the bump stops 230 are triangular-shaped (e.g., irregular triangular-shaped) and have an outer surface 232 (e.g., an arcuate outer surface) configured to support an adjacent spoke 205 as schematically depicted by the arrows in FIG. 4B. Particularly, during deformation and/or compressive strain of one or more spokes 205 (not shown), a bump stop 230 limits the inner movement or deflection at the initial spring rate of the spoke(s) 205 by providing a stop (i.e., outer surface 232) that limits or reduces the movement and strain of the spoke(s) 205 compared to deformation and/or compressive strain that would occur if the bump stop 230 were not present. It should be understood that the inner leg 206 of the spokes 205 comes in contact with and is supported by the outer surface 232 of the bump stop 230. Accordingly, the deformation and strain of the inner leg 206, the inner end 206*a*, the outer leg 207, and/or the outer end 207*a* is reduced. It should be understood that reducing deformation and/or compressive strain of the spokes 205 using the bump stops 230 enhances the durability of the spokes 205 and the non-pneumatic tire 22.

Figure 5A:
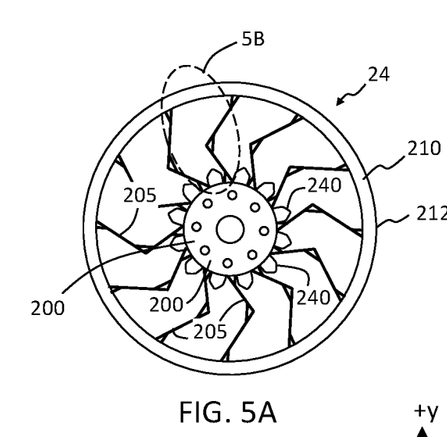
FIG. 5A is a side view of another non-pneumatic tire according to the teachings of the present disclosure.
Figure 5B:
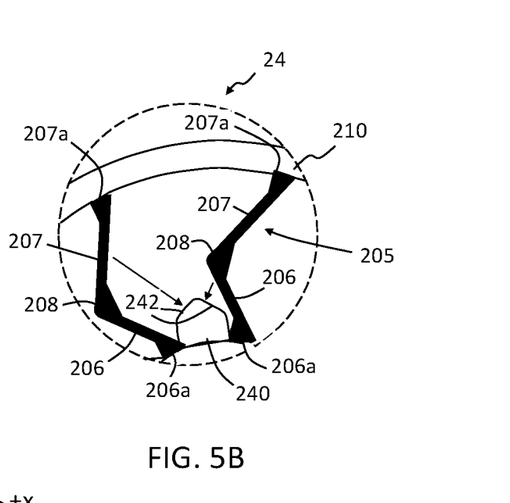
FIG. 5B is an enlarged view of circled region 5B in FIG. 5A with spokes of the non-pneumatic tire in an unstrained position.

Referring now to FIGS. 5A and 5B, another non-pneumatic tire 24 according to the teachings of the present disclosure is schematically depicted. With reference to FIG. 5A, the non-pneumatic tire 24 includes the wheel portion 200, the tread ring portion 210, and the plurality of spokes 205 extending between and attached to the wheel portion 200 and the tread ring portion 210. With reference to FIG. 5B, an enlarged view of circled region 5B shown in FIG. 5A is schematically depicted with the spokes 205 in an unstrained state. Positioned between adjacent spokes 205 are roof-top shaped bump stops 240. That is, each of the bump stops 240 have a roof-top shaped with a pair of outer surfaces 242 (e.g., arcuate outer surfaces) configured to support adjacent spokes 205 as schematically depicted by the arrows in FIG. 5B. In some variations of the present disclosure, the bump stops 240 are symmetrical roof-top shaped bump stops. In other variations the bump stops 240 are non-symmetrical roof-top shaped bump stops. The bump stop(s) 240 limits deformation and/or compressive strain of the spoke(s) 205 compared to deformation and/or compressive strain that would occur if the bump stop(s) 240 was not present. Particularly, and as schematically depicted by the arrows in FIG. 5B, the inner leg 206 of one adjacent spoke 205 (e.g., a spoke 205 to the right (+x direction) of a bump stop 240) comes into contact with and is supported by one of the outer surfaces 242 of the bump stop 240. Also, an outer leg 207 of another adjacent spoke 205 (e.g., a spoke 205 to the left (−x direction) of a bump stop 240) comes into contact with and is supported by another outer surface 242 of the bump stop 240. Accordingly, the deformation and strain of the inner leg 206, the inner end 206*a*, the outer leg 207, and/or the outer end 207*a* is reduced. It should be understood that reducing deformation and/or compressive strain of the spokes 205 using the bump stops 240 enhances the durability of the spokes 205 and the non-pneumatic tire 24.

Figure 6:
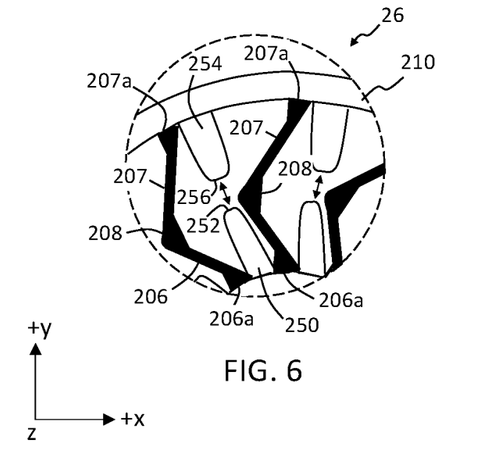
FIG. 6 is an enlarged view of spokes of another non-pneumatic tire in an unstrained condition according to the teachings of the present disclosure.

Referring now to FIG. 6 another non-pneumatic tire 26 according to the teachings of the present disclosure is schematically depicted. The non-pneumatic tire 26 includes the wheel portion 200 (not labeled), the tread ring portion 210, and the plurality of spokes 205 extending between and attached to the wheel portion 200 and the tread ring portion 210. The spokes 205 are schematically depicted in FIG. 6 in an unstrained state. Positioned between each pair of adjacent spokes 205 is an inner tower bump stop 250 and an outer tower bump stop 254 (also referred to herein as a "pair of bump stops 250, 254"). In some variations of the present disclosure, the inner tower bump stops 250 are symmetrical tower bump stops and/or the outer tower bump stops 254 are symmetrical bump stops. In other variations of the present disclosure, the inner tower bump stops 250 are non-symmetrical tower bump stops and/or the outer tower bump stops 254 are non-symmetrical bump stops.

The inner bump stop 250 comprises an outer surface 252 (e.g., an arcuate outer surface) and the outer bump stop 254 comprises an inner support surface 256 (e.g., an inner arcuate surface). The pair of bump stops 250, 254 are positioned relative to each other such that deformation and/or compressive strain of the tread ring portion 210 and the spokes 205 results in the outer surface 252 and the inner support surface 256 coming into contact with each other as indicated by the double-headed arrows in FIG. 6, thereby reducing deformation and/or compressive strain of the spokes 205. It should be understood that reducing deformation and/or compressive strain of the spokes 205 using the bump stops 250, 254 enhances the durability of the spokes 205 and the non-pneumatic tire 26.

Figure 7:
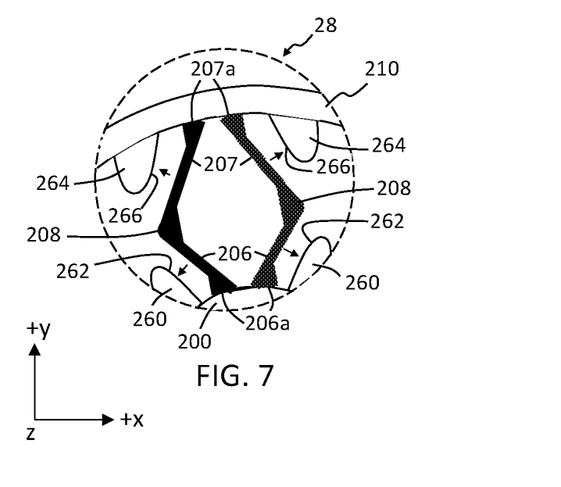
FIG. 7 is an enlarged view of spokes of another non-pneumatic tire in an unstrained condition according to the teachings of the present disclosure.

Referring now to FIG. 7 another non-pneumatic tire 28 according to the teachings of the present disclosure is schematically depicted. The non-pneumatic tire 28 includes the wheel portion 200, the tread ring portion 210, and the plurality of spokes 205 extending between and attached to the wheel portion 200 and the tread ring portion 210. The spokes 205 are schematically depicted in FIG. 7 in an unstrained state. However, unlike the spokes 205 schematically depicted in FIGS. 3A-6 the spokes 205 are arrange in a diamond-shaped pattern (i.e., the spokes 205 face each other). Positioned adjacent to each pair of adjacent spokes 205 that form a diamond-shape (i.e., positioned outside the diamond shape) is an inner tower bump stop 260 and an outer tower bump stop 264 (also referred to herein as a "pair of tower bump stops 260, 264"). The inner tower bump stop 260 comprises an outer surface 262 (e.g., an arcuate outer surface) positioned and configured to support the inner leg 206 and the outer tower bump stop 264 comprises an inner support surface 266 (e.g., an arcuate inner surface) positioned and configured to support the outer leg 207 as schematically depicted by the arrows in FIG. 7. Particularly, the inner leg 206 of a spoke 205 comes into contact with and is supported by one of the outer surfaces 262 of the inner tower bump stop 260 and an outer leg 207 of the spoke 205 comes into contact with and is supported by the inner support surface 266 of the outer tower bump stop 264 positioned opposite the bump stop 260 as indicated by the arrows in FIG. 7. Accordingly, deformation and/or compressive strain of the inner leg 206, the inner end 206*a*, the outer leg 207, and/or the outer end 207*a* is reduced. It should be understood that reducing deformation and compressive strain of the spokes 205 using the pair of tower bump stops 260, 264 enhances the durability of the spokes 205 and the non-pneumatic tire 28.

Figure 8:
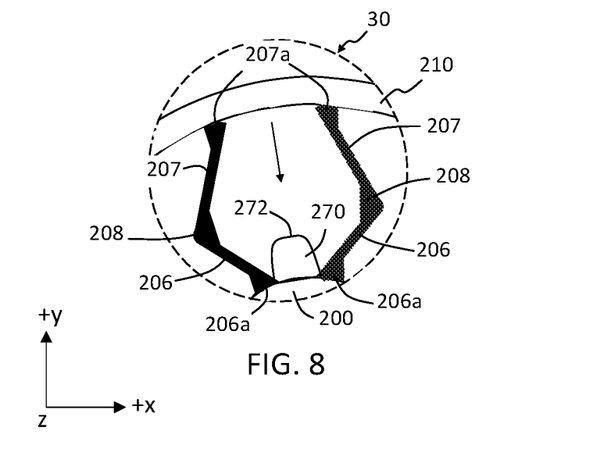
FIG. 8 is an enlarged view of spokes of another non-pneumatic tire in an unstrained condition according to the teachings of the present disclosure.

Referring now to FIG. 8 another non-pneumatic tire 30 according to the teachings of the present disclosure is schematically depicted. The non-pneumatic tire 30 includes the wheel portion 200, the tread ring portion 210, and the plurality of spokes 205 extending between and attached to the wheel portion 200 and the tread ring portion 210. The spokes 205 are schematically depicted in FIG. 8 in an unstrained state, and similar to the spokes 205 schematically depicted in FIG. 7, the spokes 205 are arranged in a diamond-shaped pattern. Positioned between each pair of adjacent spokes 205 that form a diamond-shape (i.e., positioned inside the diamond shape) is a tower bump stop 270. In some variations of the present disclosure the tower bump stop 270 is a symmetrical tower bump stop. The tower bump stop 270 comprises an outer surface 272 (e.g., an arcuate outer surface) positioned and configured to reduce inward movement and flex of the tread ring portion 210 as schematically depicted by the arrow in FIG. 8. Particularly, during compressive strain (not shown) of the tread ring portion 210, the tread ring portion 210 comes into contact with and is supported by the outer surface 272 of the tower bump stop 270 such that deformation and/or compressive strain of the spoke(s) 205 is limited or reduced compared to deformation and/or compressive strain that would occur if the tower bump stop 270 was not present. Accordingly, deformation and/or compressive strain of the inner leg 206, the inner end 206a, the outer leg 207, and/or the outer end 207a is reduced. It should be understood that reducing deformation and/or compressive strain of the spokes 205 using the tower bump stops 270 enhances the durability of the spokes 205 and the non-pneumatic tire 30.

In some variations of the present disclosure, the bump stops 220, and other bumps stops disclosed herein, are formed during molding of the wheel portion 200. In such variations, the bump stops can be formed from the same material as the wheel portion 200, the spokes 205, and/or tread ring portion 210. In other variations of the present disclosure, the bump stops are overmolded on the wheel portion 200. In such variations, the bump stops may be formed from materials that are different than the wheel portion 200, the spokes 205, and/or tread ring portion 210. Non-limiting materials used to form the wheel portion, tread ring portion and spokes include polyurethane (PU), polypropylene (PP), polyamides, and the like. Non-limiting examples of the use to form the bump stops include natural rubber, PU, polychloroprene, ethylene propylene dien methylene (EPDM) rubber, and the like.

While the figures schematically depict non-pneumatic tires with only one type of bump stop, it should be understood that non-pneumatic tires disclosed herein can include more than one type of bump stop that limits or reduces deformation and strain of the spokes of the non-pneumatic tire. It should also be understood that while the spokes shown in the figures have a given shape, spokes with other shapes, dimensions, etc., are included within the present disclosure.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A non-pneumatic tire comprising:
a wheel portion;
a tread ring portion;
a plurality of flexible spokes, each of the plurality of flexible spokes including an outer leg attached to and extending from the tread ring portion, an inner leg attached to and extending from the wheel portion, and an elbow positioned between the inner leg and the outer leg, the elbow having a thickness that is greater than a thickness of the outer leg and greater than a thickness of the inner leg; and
at least one inner bump stop positioned between the wheel portion and the tread ring portion and extending radially outward from the wheel portion, wherein the at least one inner bump stop is configured to limit deformation and strain of the plurality of flexible spokes upon engagement with at least one of the inner leg and the elbow of at least one of the plurality of flexible spokes.

2. The non-pneumatic tire according to claim 1, wherein the at least one inner bump stop comprises a plurality of tower bump stops positioned between adjacent flexible spokes and extending from the wheel portion towards the tread ring portion.

3. The non-pneumatic tire according to claim 2, wherein the plurality of tower bump stops each comprise an outer surface configured for the adjacent flexible spokes to contact during compression of the adjacent flexible spokes.

4. The non-pneumatic tire according to claim 3, wherein the plurality of tower bump stops comprise a plurality of symmetrical tower bump stops.

5. The non-pneumatic tire according to claim 1, wherein the at least one inner bump stop comprises a plurality of triangular-shaped bump stops positioned between adjacent flexible spokes and extending from the wheel portion towards the tread ring portion.

6. The non-pneumatic tire according to claim 5, wherein the plurality of triangular-shaped bump stops each comprise an outer surface configured for the adjacent flexible spokes to contact during compression of the adjacent flexible spokes.

7. The non-pneumatic tire according to claim 6, wherein the plurality of triangular-shaped bump stops comprise a plurality of irregular triangular-shaped bump stops, each of the plurality of irregular triangular-shaped bump stops including an arcuate outer surface.

8. The non-pneumatic tire according to claim 1, wherein the at least one inner bump stop comprises a plurality of roof-top shaped bump stops positioned between adjacent flexible spokes and extending from the wheel portion towards the tread ring portion.

9. The non-pneumatic tire according to claim 8, wherein the plurality of roof-top shaped bump stops each comprise a pair of outer surfaces configured for the adjacent flexible spokes to contact during compression of the adjacent flexible spokes.

10. The non-pneumatic tire according to claim 9, wherein the plurality of roof-top shaped bump stops comprise a plurality of symmetrical roof-top shaped bump stops.

11. The non-pneumatic tire according to claim 1, wherein the at least one inner bump stop comprises a first set of tower bump stops positioned between each pair of adjacent flexible spokes and extending from the wheel portion towards the tread ring portion, and wherein the non-pneumatic tire further comprises at least one outer bump stop, the at least one outer bump stop comprises a second set of tower bump stops positioned between each pair of adjacent flexible spokes and extending from the tread ring portion towards the wheel portion.

12. The non-pneumatic tire according to claim 11, wherein each of the first set of tower bump stops comprise an outer surface and each of the second set of tower bump stops comprise an inner surface.

13. The non-pneumatic tire according to claim 1, further comprising a plurality of inner tower bump stops and a plurality of outer tower bump stops, the inner tower bump stops extending from the wheel portion towards the tread ring portion, the outer tower bump stops extending from the tread ring portion towards the wheel portion, wherein an outer surface of each inner tower bump stop and an inner surface of each outer tower bump stop are configured to oppose and abut against each other and limit compression of the adjacent flexible spokes.

14. The non-pneumatic tire according to claim 1, wherein the elbow connects the inner leg to the outer leg to form a V-shape.

15. The non-pneumatic tire according to claim 1, further comprising a plurality of tower bump stops extending from the wheel portion towards the tread ring portion, each tower bump stop comprises an outer surface configured to abut against the tread ring portion and limit compression of the adjacent flexible spokes.

16. A non-pneumatic tire comprising:
a wheel portion;
a tread ring portion with a tread;
a plurality of flexible spokes, each of the plurality of flexible spokes including an outer leg attached to and extending from the tread ring portion, an inner leg attached to and extending from the wheel portion, and an elbow positioned between the inner leg and the outer leg, the elbow having a thickness that is greater than a thickness of the outer leg and greater than a thickness of the inner leg; and
a plurality of inner bump stops positioned between the wheel portion and the tread ring portion and extending radially outward from the wheel portion, wherein the plurality of inner bump stops is configured to limit deformation and strain of the plurality of flexible spokes upon engagement with at least one of the inner leg and the elbow of at least one of the plurality of flexible spokes.

17. The non-pneumatic tire according to claim 16, wherein the plurality of inner bump stops is selected from the group consisting of a plurality of tower bump stops positioned between respective pairs of adjacent flexible spokes and extending from the wheel portion towards the tread ring portion, a plurality of triangular-shaped bump stops positioned between respective pairs of adjacent flexible spokes and extending from the wheel portion towards the tread ring portion, a plurality of roof-top shaped bump stops positioned between respective pairs of adjacent flexible spokes and extending from the wheel portion towards the tread ring portion, and a first set of tower bump stops positioned between respective pairs of adjacent flexible spokes and extending from the wheel portion towards the tread ring portion and configured to oppose a second set of tower bump stops positioned between respective pairs of adjacent flexible spokes and extending from the tread ring portion towards the wheel portion.

18. The non-pneumatic tire according to claim 16, further comprising a plurality of tower bump stops positioned between adjacent flexible spokes and extending from the wheel portion towards the tread ring portion and each of the plurality of tower bump stops has an outer surface configured to abut against the tread ring portion and limit compression of the pairs of adjacent flexible spokes.

19. A non-pneumatic tire comprising:
a wheel portion;
a tread ring portion with a tread;
a plurality of flexible spokes, each of the plurality of flexible spokes including an outer leg attached to and extending from the tread ring portion, an inner leg attached to and extending from the wheel portion, and an elbow positioned between the inner leg and the outer leg, the elbow having a thickness that is greater than a thickness of the outer leg and greater than a thickness of the inner leg; and
a plurality of inner bump stops positioned between adjacent flexible spokes and extending between the wheel portion and the tread ring portion, wherein the plurality of inner bump stops is configured to limit deformation and strain of the plurality of flexible spokes upon engagement with at least one of the inner leg and the elbow of at least one of the plurality of flexible spokes.

20. The non-pneumatic tire according to claim 19, wherein the plurality of inner bump stops is selected from the group consisting of a plurality of tower bump stops positioned between each pair of adjacent flexible spokes and extending from the wheel portion towards the tread ring portion, a plurality of triangular-shaped bump stops positioned between each pair of adjacent flexible spokes and extending from the wheel portion towards the tread ring portion, a plurality of roof-top shaped bump stops positioned between each pair of adjacent flexible spokes and extending from the wheel portion towards the tread ring portion, a first set of tower bump stops positioned between each pair of adjacent flexible spokes and extending from the wheel portion towards the tread ring portion and configured to oppose a second set of tower bump stops positioned between each pair of adjacent flexible spokes and extending from the tread ring portion towards the wheel portion.

* * * * *